(12) United States Patent
Otani et al.

(10) Patent No.: US 6,567,100 B1
(45) Date of Patent: May 20, 2003

(54) METHOD AND APPARATUS FOR IMAGE SYNTHESIS

(75) Inventors: Kazuhiko Otani, Ohta-ku (JP); Tomohiko Suemitsu, Ohta-ku (JP)

(73) Assignee: Namco Ltd., Tokyo (JP)

( * ) Notice: Subject to any disclaimer, the term of this patent is extended or adjusted under 35 U.S.C. 154(b) by 266 days.

(21) Appl. No.: 09/604,768

(22) Filed: Jun. 28, 2000

(30) Foreign Application Priority Data

Jul. 2, 1999 (JP) .......................................... 11-189789

(51) Int. Cl.[7] ................................................. G09G 5/00
(52) U.S. Cl. ...................................................... 345/629
(58) Field of Search ................................. 345/426, 629, 345/589, 606, 611, 617; 382/268, 264

(56) References Cited

U.S. PATENT DOCUMENTS 6,078,333 A * 6/2000 Wittig et al. ................ 345/426
6,256,068 B1 * 7/2001 Takada et al. ............... 348/441

* cited by examiner

*Primary Examiner*—Cliff N. Vo
*Assistant Examiner*—Linzy McCartney
(74) *Attorney, Agent, or Firm*—Oblon, Spivak, McClelland, Maier & Neustadt, P.C.

(57) ABSTRACT

Disclosed is an image synthesis method in which image are synthesized so as not to create mach band. Primary differential of brightness of an image to be synthesized changes continuously (a). When the brightness of the image to be synthesized changes in this manner, primary differential of brightness of a synthesized image by superposing is also continuous, thus the brightness does not change suddenly and mach band does not occur (b).

7 Claims, 4 Drawing Sheets

PRIMARY DIFFERENTIAL IS CONTINUOUS (a)

(b)

(a)

MACH BAND (b)

MACH BAND (a)

PRIMARY DIFFERENTIAL IS CONTINUOUS (b)

METHOD AND APPARATUS FOR IMAGE SYNTHESIS

CROSS-REFERENCE TO RELATED APPLICATION

The present application claims priority under 35 U.S.C. §119 to Japanese Patent Application No. Hei 11-189789, filed Jul. 2, 1999, entitled "Method And Apparatus For Image Synthesis." The contents of that application are incorporated herein by reference in their entirety.

BACKGROUND OF THE INVENTION

1. Field of the Invention

The present invention relates to an image generation by using a computer, that is, a field of computer graphics, more particularly to superposing a plurality of images each of which changes its brightness.

2. Description of the Related Art

An image generation technology by using a computer is utilized in various ways, for example, in a field of computer games. In the field of computer games, for example, in the hardware constitution shown in FIG. 1, a variety of images are generated and a plurality of the generated images are synthesized.

In FIG. 1, a CPU 102 controls the processing of the entire system. An input interface 104 performs interfacing to enter an input from an input apparatus (not shown) to the system. A sound device 106 generates music and effect sound by control of the CPU 102, and outputs them through speaker (not shown). A ROM 108 and a RAM 110 store programs and data used by the CPU 102, a geometry processing device 112 and the like.

The CPU 102, for example, stores such as geometry data corresponding to a location information of a car which is operated by a game player, in a geometry memory 114. The geometry processing device 112 reads out geometry data stored in the geometry data memory 114, and performs a three-dimensional coordinate transformation processing on data of a vertex data memory 120. Based on the three-dimensional data which performed the coordinate transformation processing, the geometry processing device performs an image generation processing in order for a drawing device 116 to display an image by referring to data of a texture memory 122 if necessary. The result is stored in a frame memory 118. Then, the geometry-processing device 112 reads out image data displayed from the frame memory 118, and sends the data to a display apparatus (not shown), thus displaying a game.

In an image generation and synthesis by using the above-described constitution for a game, there are cases where a plurality of images each of which changes its brightness as shown in FIG. 2(a) are superposed and synthesized. Such processing is often performed in the drawing device 116 in FIG. 1. FIG. 2(b) shows the change of brightness of a half of an image in the case that the brightness is symmetric with respect to a point. On the graph in FIG. 2(b) showing a relation between the position and the brightness of the image, there is a point where primary differential of its brightness change is discontinuous. In the graph of FIG. 2(b), a point where a straight line is broken is the discontinuous point.

As described above, a synthesis by superposing of two images that change their brightness is considered. FIG. 3 shows the synthesis result. As shown in FIG. 3(a), when two images each of which changes its brightness are synthesized by superposing, a line called a "mach band" may occur which is not intended to be made. The mach band will be described in a drawing shown in FIG. 3(b), which shows a relation between brightness and position when the two images are synthesized. FIG. 3(b) is a graph showing brightness change in the position of the x-axis direction shown in FIG. 3(a). The graph clarifies that the brightness of the image shows $\alpha$ and $\beta$ at a point A and a point B respectively, where the two images synthesized are crossed, and that the brightness of the image changes such that the line is broken at the A and B points. At these A and B points primary differential becomes discontinuous, and thus the mach band occurs.

SUMMARY OF THE INVENTION

The object of the present invention is to prevent a mach band from occurring when two images each of that changes its brightness are synthesized by superposing.

In order to achieve the above-described object, the method of image synthesis of the present invention generates an image such that primary differential of its brightness is continuous, and performs an image synthesis without occurrence of mach band by superposing the plurality of the generated images.

Image processing may be performed so that a plurality of images are processed so as to make primary differential of brightness of each image continuous, and the processed images are superposed upon one another so as not to create mach band.

As described above, since image processing may be performed so that primary differential of brightness of an image to be synthesized is continuous, superposed images show continuous primary differential of brightness, and image brightness does not make an acute change. Accordingly, mach band does not occur.

An apparatus for realizing the above-described image synthesis method and a recording medium for storing a program which allows a computer to realize the image synthesis are also within the scope of the present invention.

BRIEF DESCRIPTION OF THE DRAWINGS

For a more complete understanding of the present invention and the advantages thereof, reference is now made to the following description taken in conjunction with the accompanying drawings.

PREFERRED EMBODIMENTS OF THE INVENTION

Next, detailed description will be made of the preferred embodiments of the present invention with reference to the accompanying drawings.

Figure 1:
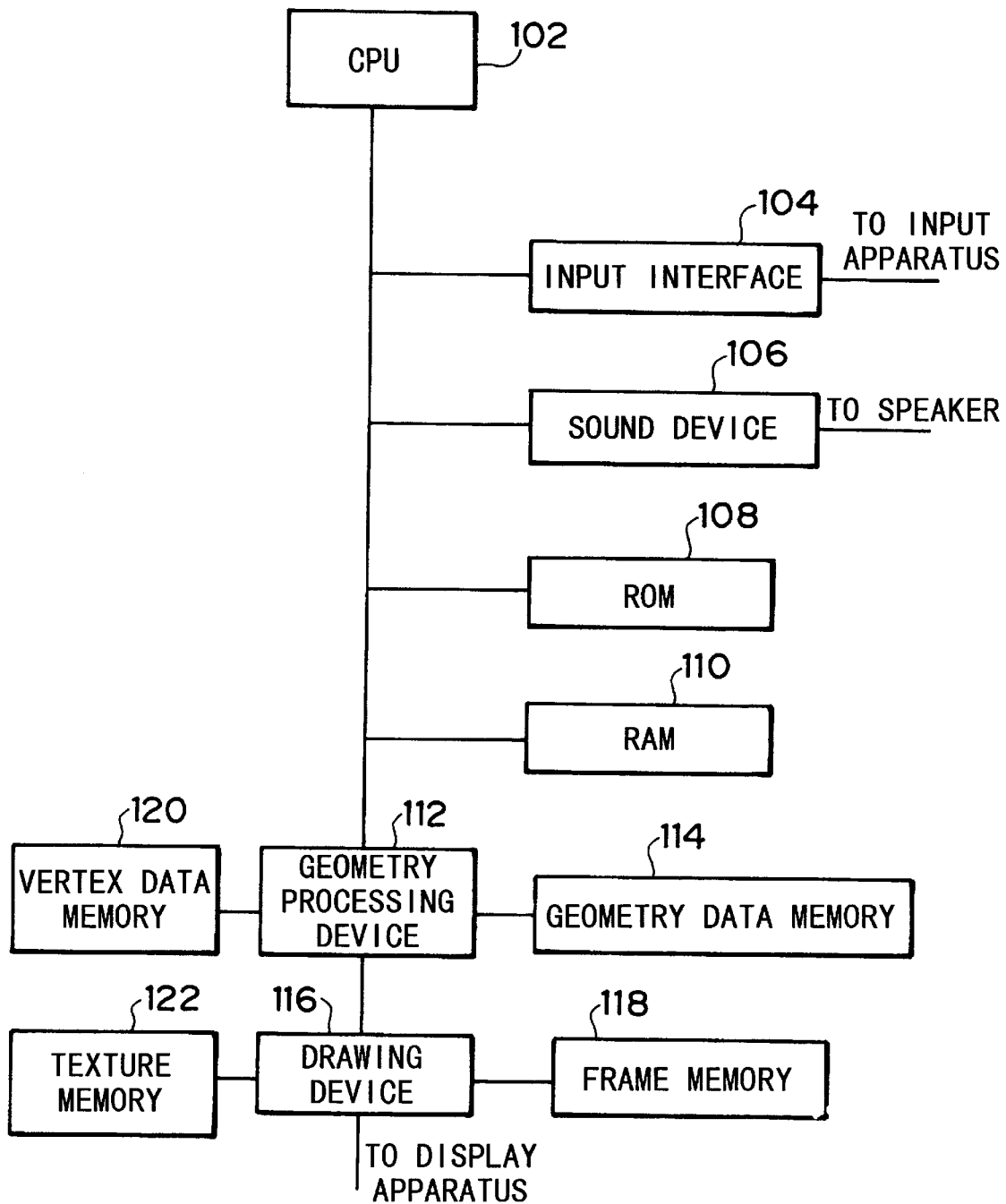
FIG. 1 is a view showing a system constitution for an image synthesis.

The image synthesis of the present invention also uses a system of the constitution shown in FIG. 1. In computer graphics where the present invention is applied, an image synthesized by superposing is generated such that primary differential of brightness change is continuous.

Figure 2:
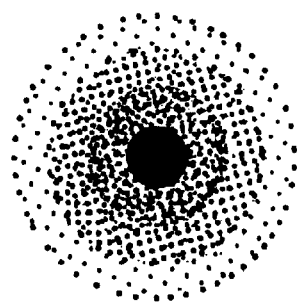
FIG. 2(a) and FIG. 2(b) are graphs showing an example of an image to be synthesized and a brightness change of the image.
Figure 2:
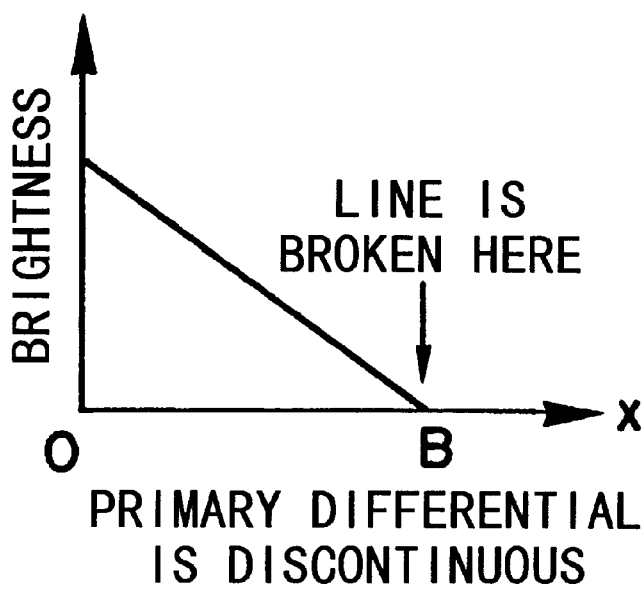
Figure 3:
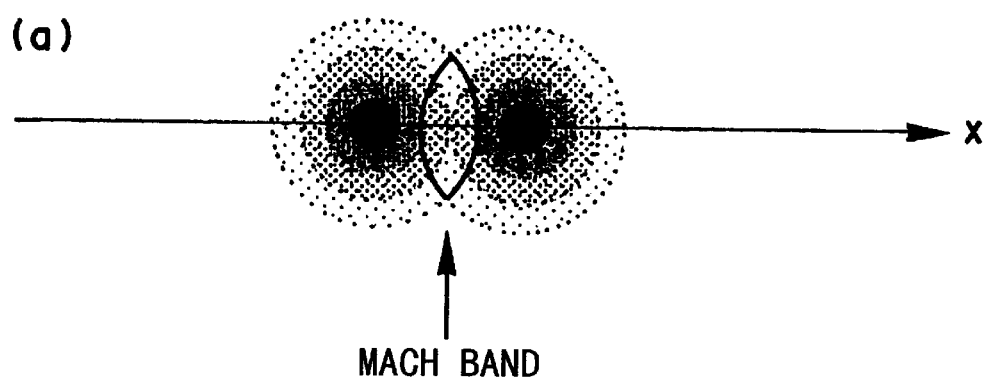
FIG. 3(a) and FIG. 3(b) are views for explaining mach band.
Figure 3:
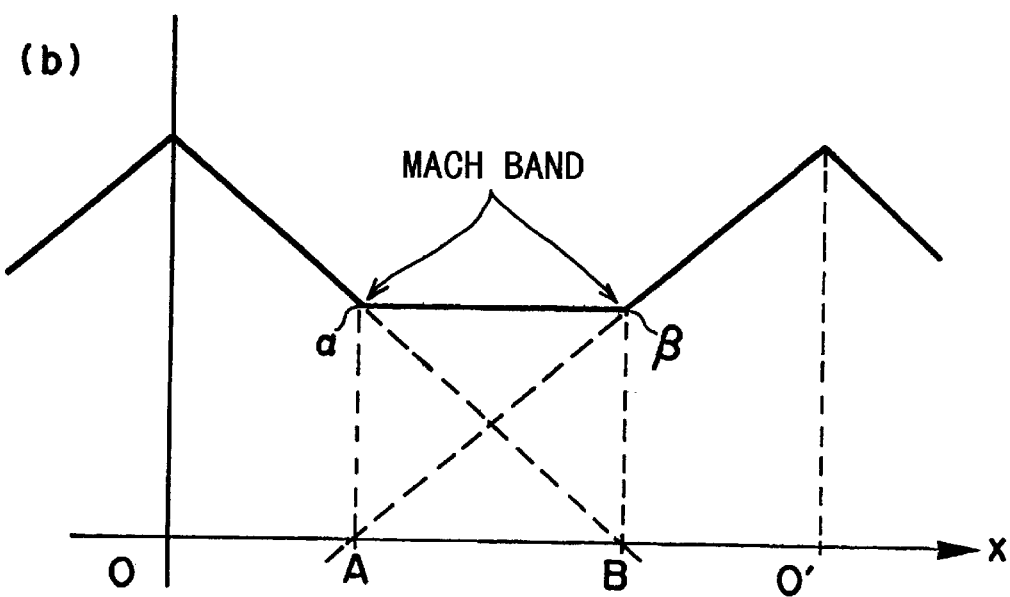
Figure 4:
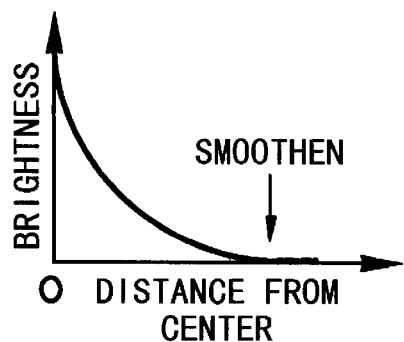
FIG. 4(a) and FIG. 4(b) are views for explaining an image synthesis of the present invention.
Figure 4:
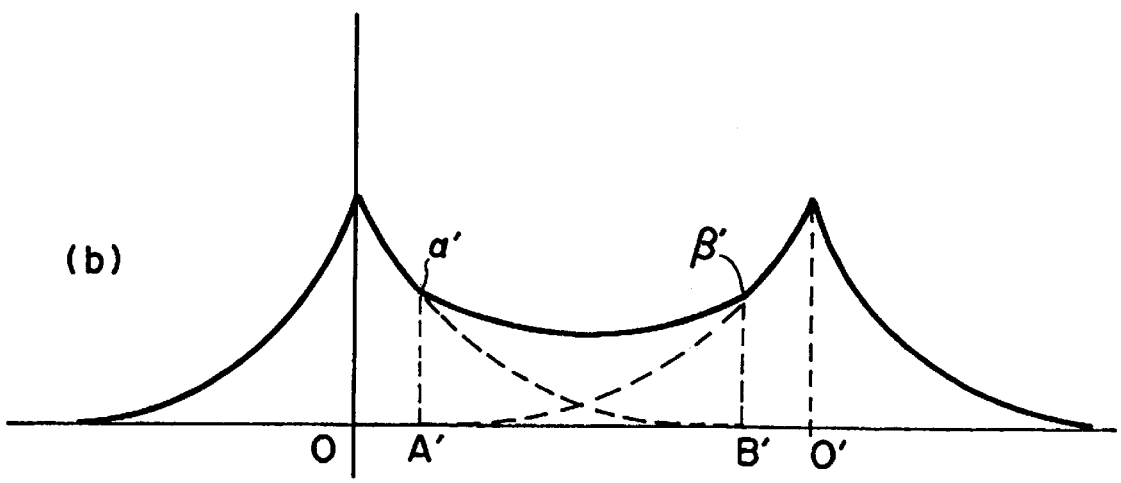

FIG. 4(*a*) shows the brightness change of the generated image. FIG. 4(*a*), similar to FIG. 2(*b*), also shows brightness change of a half of an image in the case that the brightness is symmetric with respect to a point. As shown in FIG. 4(*a*), primary differential of the brightness of the image is continuous except for the center of the image. When such an image is synthesized such that primary differential of its brightness is constantly continuous, primary differential of the brightness change becomes continuous in the image synthesized by superposing. FIG. 4(*b*) shows the brightness change. In FIG. 4(*b*), the brightness changes smoothly at a point A' and a point B' respectively, where images are superposed, which shows primary differential is continuous.

As described above, the present invention changes the brightness of an image generated by a computer such that the primary differential of the brightness of the image is continuous. The brightness of the synthesized image changes such that its primary differential is continuous, even when a plurality of the images are synthesized by superposing. Therefore, mach band does not occur.

The function is shown as follows when, for example, the brightness of two-dimensional image is F (x, y).

$$F(x,y) = k_1 \cdot e^{-k_2 \sqrt{(x-x_0)^2 + (y-y_0)^2}} \quad \text{Function 1}$$

Note that reference numerals $k_1$ and $k_2$ denote the positive constant; e base of natural logarithm; $(x_0, y_0)$ the center coordinate.

An image represented by the function has brightness of $k_1$ at the center $(x_0, y_0)$, and the value of the brightness approaches 0 according as a coordinate goes off from the center. The larger the value of $k_2$ becomes, the more suddenly the image darkens. Primary differential of the function is continuous at all points except for the center $(x_0, y_0)$. Therefore, when an image having a brightness change, which is prescribed by the function, is synthesized, primary differential becomes continuous at the points except for the center, and the discontinuous portion does not become linear. As a result, mach band does not occur.

Image generation without occurrence of mach band has been described above by exemplifying a computer graphics used in such as computer games. However, the above-described technology can be applied not only to the computer graphics where an image is generated by a computer, but also to the field of image processing where an image is taken in by a video camera and a scanner in a computer and the taken image is processed. In this case, primary differential does not change continuously regarding the brightness of the image which is read and stored. Accordingly, mach band tends to occur if a plurality of the images are synthesized by superposing. Image processing is performed to the stored image in such a manner that primary differential of the brightness changes continuously. By such processing, primary differential of the brightness of the stored image can be continuous. After the process, the superposition of a plurality of the stored images makes it possible to allow the synthesized images not to generate mach band.

The present invention can be applied not only to a stand-alone computer system, but also to, for example, such as a client server system constituted of a plurality of systems. The program for the present invention is read out and executed by the system from the storage medium storing the program, and thus the constitution of the invention can be realized. For such a recording medium, one may be selected from a floppy disk, a CD-ROM, a magnetic tape, a ROM cassette, and so on.

In the present invention, as described above, primary differential of the brightness of a synthesized image changes continuously. Accordingly, in the case where a plurality of the images are synthesized by superposing, primary differential of the brightness of the synthesized image changes continuously, thus mach band does not occur.

Although the preferred embodiment of the present invention has been described in detail, it should be understood that various changes, substitutions and alternations can be made therein without departing from spirit and scope of the inventions as defined by the appended claims.

What is claimed is:

1. An image synthesis method comprising:
   generating a plurality of images so that primary differential of brightness of each image changes along a distance without discontinuity; and
   superposing said generated images upon another,
   wherein an image synthesis is performed so as not to create mach band.

2. An image synthesis method comprising:
   processing a plurality of images so that primary differential of brightness of each image processed changes along a distance without discontinuity; and
   superposing said processed images,
   wherein an image synthesis is performed so as not to create mach band.

3. An image synthesis apparatus comprising:
   means for generating images so that primary differential of brightness of each of the generated images changes along a distance without discontinuity; and
   means for superposing said generated images,
   wherein an image synthesis is performed so as not to create mach band.

4. An image synthesis apparatus comprising:
   storing means for storing images to be synthesized;
   means for processing the images stored in said storing means so that primary differential of brightness of each of the images changes along a distance without discontinuity; and
   means for superposing the processed images,
   wherein an image synthesis is performed so as not to create mach band.

5. A recording medium which stores a program for controlling a computer to perform the steps of:
   generating a plurality of images so that primary differential of brightness of each image changes along a distance without discontinuity; and
   superposing said generated images upon another,
   wherein an image synthesis is performed so as not to create mach band.

6. A recording medium which stores a program for controlling a computer to perform the steps of:
   processing a plurality of images so that primary differential of brightness of each image processed changes along a distance without discontinuity; and
   superposing said processed images,
   wherein an image synthesis is performed so as not to create mach band.

7. An image synthesis method comprising:
   generating a plurality of images each having brightness whose primary differential with respect to a distance changes along the distance without discontinuity; and
   superposing one of said images upon another of said images.

* * * * *